(12) United States Patent
Fichtner et al.

(10) Patent No.: US 8,745,985 B2
(45) Date of Patent: Jun. 10, 2014

(54) STEAM POWER PLANT WITH A COOLING SYSTEM

(75) Inventors: Markus Fichtner, Wolframs-Eschenbach (DE); Mark Reissig, Rückersdorf (DE); Marc Sattelberger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 153 days.

(21) Appl. No.: 13/376,881

(22) PCT Filed: May 26, 2010

(86) PCT No.: PCT/EP2010/057197
§ 371 (c)(1),
(2), (4) Date: Dec. 8, 2011

(87) PCT Pub. No.: WO2010/149448
PCT Pub. Date: Dec. 29, 2010

(65) Prior Publication Data
US 2012/0111005 A1 May 10, 2012

Related U.S. Application Data

(60) Provisional application No. 61/220,669, filed on Jun. 26, 2009.

(51) Int. Cl.
*F01K 9/00* (2006.01)
*F01K 13/02* (2006.01)

(52) U.S. Cl.
CPC ..................................... *F01K 9/003* (2013.01)
USPC ................. 60/661; 60/660; 60/646

(58) Field of Classification Search
CPC ..................................................... F01K 9/003
USPC ................. 60/456, 39.83, 643–681; 62/332; 165/104.11–104.34
See application file for complete search history.

(56) References Cited

U.S. PATENT DOCUMENTS

| | | | | |
|---|---|---|---|---|
| 3,851,702 A | * | 12/1974 | Heller et al. | 165/110 |
| 3,935,902 A | * | 2/1976 | Heller et al. | 165/110 |
| 4,144,723 A | * | 3/1979 | Morse et al. | 62/332 |
| 4,212,168 A | * | 7/1980 | Bouchard et al. | 60/661 |

(Continued)

FOREIGN PATENT DOCUMENTS

| | | | |
|---|---|---|---|
| AT | 317944 B | * | 9/1974 |
| CN | 1413287 A | | 4/2003 |

(Continued)

*Primary Examiner* — Thomas Denion
*Assistant Examiner* — Laert Dounis

(57) ABSTRACT

In a steam power plant, a first cooling circuit includes a condenser for condensing steam and a first pump for pumping a first cooling fluid through the condenser in order to cool the condenser. A third cooling circuit is a closed cycle cooling circuit that utilizes a second cooling fluid for cooling down at least one component that is different from the condenser. A second cooling circuit includes a heat exchanger that thermally couples the first cooling fluid and the second cooling fluid and utilizes the first cooling fluid in the heat exchanger for cooling down the second fluid and further includes a second pump for pumping the first cooling fluid through the second cooling circuit independently from an operation of the first pump.

16 Claims, 6 Drawing Sheets

(56) References Cited

U.S. PATENT DOCUMENTS

| | | | |
|---|---|---|---|
| 4,315,404 A * | 2/1982 | Schmitt et al. | 60/690 |
| 6,374,591 B1 | 4/2002 | Johnson | |
| 6,405,520 B1 | 6/2002 | Gebke | |
| 7,062,913 B2 * | 6/2006 | Christensen et al. | 60/651 |
| 2003/0000209 A1 * | 1/2003 | Madl | 60/456 |
| 2009/0064710 A1 * | 3/2009 | Kaga et al. | 62/498 |

FOREIGN PATENT DOCUMENTS

| | | |
|---|---|---|
| DE | 102006028746 A1 | 12/2007 |
| JP | 2003518219 A | 6/2003 |
| WO | WO 0146565 A1 | 6/2001 |

* cited by examiner

STEAM POWER PLANT WITH A COOLING SYSTEM

CROSS REFERENCE TO RELATED APPLICATIONS

This application is the US National Stage of International Application No. PCT/EP2010/057197 filed May 26, 2010, and claims the benefit thereof. The International Application claims the benefits of U.S. Provisional Application No. 61/220,669 US filed Jun. 26, 2009. All of the applications are incorporated by reference herein in their entirety.

FIELD OF INVENTION

The invention relates to a steam power plant that comprises a cooling system, the cooling system comprises a first cooling circuit, a second cooling circuit and a third cooling circuit. The invention also relates to a method of operating a cooling system of such a steam power plant. The invention also relates to a control unit for such a steam power plant.

BACKGROUND OF INVENTION

In a common steam power plant three cooling circuits are used to perform various cooling operations.

A first cooling circuit is often termed "circulating water piping and culvert system" or main cooling circuit, abbreviated "PAB". It provides the highest cooling power in the power plant. It comprises a condenser and a first pipe system that is split into a hot part and a cold part. The cold part connects a cold-fluid outlet of a cooling tower with an inlet of the condenser. The hot part connects a hot-fluid inlet of the cooling tower with an outlet of the condenser. The cooling tower is used to cool a first cooling fluid. The PAB has at least one first pump, which is often termed circulating water pump or main pump. The first pump is located inside of the cooling tower. When switched on, the first pump pumps a first cooling fluid (water) from the cooling tower through the cold part of the first pipe system, through the condenser where it heats up, through the hot part of the first pipe system and back to the cooling tower. In the condenser the first fluid cools down the condenser. The cooled condenser cools down the hot steam to condense the steam. The hot steam is fed into the condenser after departing from a steam turbine. The steam turbine is driven by the steam and used to drive a generator that generates electricity.

A second cooling circuit is often termed "service water piping and culvert system" or auxiliary cooling system, abbreviated "PCB". It comprises a second pipe system and a heat exchanger. The heat exchanger comprises an inlet and an outlet. Also the second pipe system is split into a cold part and a hot part. The cold part connects the cold-fluid outlet of the cooling tower with the inlet of the heat exchanger. The hot part connects the hot-fluid inlet of the cooling tower with the outlet of the heat exchanger. At its hot part the second pipe system is partly realized by a section of the first pipe system that is connected with the cooling tower. This part is termed "first common pipe section". Also at its cold part the second pipe system is partly realized by a section of the first pipe system that is connected with the cooling tower. This part is termed "second common pipe system".

The PCB uses the first cooling fluid to cool down the heat exchanger. Only during operation of the first pump the first cooling fluid flows from the cooling tower through the cold part of the second pipe system, the heat exchanger where it heats up and the hot part of the second pipe system back into the cooling tower.

Sometimes the second cooling circuit is equipped with a small booster pump located in its cold part but not in the second common pipe section. The booster pump boosts the flow of the first fluid after it branches of from the second common pipe section. The booster pump is necessary if a plate heat exchanger is used. In operation the booster pump increase the pressure in the plate heat exchanger if the pressure drop over the PCB is higher than over the PAB. This ensures a sufficient high flow rate of the first cooling fluid that flows through the plate heat exchanger, which in turn avoids damages of the heat exchanger. The operation of the booster pump is always synchronized with the operation of the first pump.

The third cooling circuit is often termed "closed cooling water system" or component cooling system, abbreviated "PGB". It is a closed cooling circuit that comprises a third pipe system and a number of component coolers that are thermally coupled with components to be cooled. Also the heat exchanger is part of the PGB. The third pipe system connects the heat exchanger with the component coolers. The component coolers are commonly known and a non-compulsory list of such component coolers may comprise: condensate pump coolers, coolers for a HTF-system (including pumps etc.), evacuation pumps coolers (e.g. for the condenser), ST lube oil coolers, generator coolers, feed water pump coolers, sampling coolers, and so on. The PGB also shows a number of closed cooling water pumps to pump a second cooling fluid (water). In the PGB the second cooling fluid is circulated between the heat exchanger and component coolers. In the heat exchanger the first cooling fluid is thermally coupled with the second cooling fluid but physically kept separate from the second cooling fluid. Heat is transferred from the second cooling fluid into the first cooling fluid.

A problem of the known steam power plant and the known method is that a proper cooling of the components can only be achieved by the aid of the first pump being in operation. The first pump is a main pump and as such without an operation of the main pump the entire cooling system is out of service. This is of particular disadvantage in case of solar steam power plants that do not have heat storage means for power generation during the night. In general, the power plant does not deliver power during its standby-mode, e.g. night operation. Typically, the solar steam power plant is driven into the standby mode on a daily basis during the night hours. Sometimes, e.g. during winter season, the standby mode is selected even multiple times a day. In contrast to its power-mode operation (power generation operation) it consumes power during the standby-mode because some components must remain in operation in order to rapidly re-start the power-mode in the morning. In addition, although no steam for generating power is produced by solar radiation, a so termed "sealing steam" is generated. In practice, saturated auxiliary steam is produced which is than overheated and becomes sealing steam. The sealing steam is fed into the turbine separately from steam used to produce electricity. From the turbine the sealing steam is at least partly guided into the condenser. Hence, in order to prevent the components and the condenser from damages due to overheating there must be a cooling operation during the standby-mode. The cooling of the components and the condenser requires the main pump to be active. In the cooling system the main pump is one of the largest power consumers and as a consequence the entire power plant shows a relatively low efficiency. A control unit of the plant keeps the main pump switched on during standby-mode.

SUMMARY OF INVENTION

It is an object of the invention to provide an improved steam power plant, in particular a solar steam power plant, an improved control unit and an improved method of operating a cooling system of a steam power plant, which avoids the problems mentioned above.

The object of the invention is achieved by a steam power plant, a control unit and a method of operating a cooling system of a steam power plant according to the claims.

According to the invention the steam power plant comprises a cooling system, the cooling system comprises a first cooling circuit, a second cooling circuit and a third cooling circuit, wherein the first cooling circuit comprises a condenser to condense steam and a first pump to pump a first cooling fluid through the condenser in order to cool the condenser, the third cooling circuit is a closed cycle cooling circuit that utilizes a second cooling fluid to cool down at least one component that is different from the condenser, and the second cooling circuit comprises a heat exchanger that thermally couples the first cooling fluid and the second cooling fluid and utilizes the first cooling fluid in the heat exchanger to cool down the second fluid and comprises a second pump to pump the first cooling fluid through the second cooling circuit independently from an operation of the first pump.

Accordingly, the control unit for a steam power plant according to the invention is designed to control an operation of a first pump during a power-mode of the plant, the first pump is comprised in a first cooling circuit and is used to pump a first cooling fluid through a condenser of the first cooling circuit in order to cool the condenser, and to switch off the first pump during a standby-mode of the plant and to switch on a second pump during the standby-mode, the second pump is comprised in a second cooling circuit of the plant and is used to pump the first cooling fluid through the second cooling circuit independently from an operation of the first pump, the second cooling circuit comprises a heat exchanger that thermally couples the first cooling fluid and a second cooling fluid of a third cooling circuit and utilizes the first cooling fluid in the heat exchanger to cool down the second fluid, the third cooling circuit is a closed cycle cooling circuit that utilizes the second cooling fluid to cool down at least one component that is different from the condenser.

The method according to the invention of operating a cooling system of such a steam power plant comprises the following steps, namely using the first pump during a power-mode, and using a second pump to pump the first cooling fluid through the second cooling circuit during a standby-mode, in which the first pump is stopped.

Herein the term "power-mode" shall mean that mode of operation of the steam power plant in which a primary source of energy, e.g. fossil fuels or the sun, causes steam to be produced for driving a turbine in order to generate electrical power. This is sometimes also termed power generation operation or power generation mode. In the power-mode the first (main) cooling circuit is in operation and the first pump is switched on in order to deliver the maximum cooling power to the condenser.

The term "standby-mode" shall mean that mode of operation of the steam power plant in which the primary source of energy is not used to cause steam to be produced but some components of the plant still need to be in operation for various reasons, e.g. to allow a rapid re-start of the power-mode. Hence, not the entire plant is put out of operation. Only the power generation is temporary switched off or interrupted for a period.

According to the invention, the second pump performs the pumping of the first fluid in its cool state through the second cooling circuit in case of a switched off first pump. But in contrast to the first pump the second pump can be designed to consume much less power when compared with the first pump because also the required cooling power of the second cooling circuit is lower than the cooling power of the first cooling circuit. As a consequence, the steam power plant—in particular if the cooling system is under control of the above mentioned control unit according to the invention—and the method of operating a cooling system of a steam power plant according to the invention realizes a more efficient steam power plant.

In detail, the flow of the first fluid in the second cooling circuit is de-coupled from its dependency on the first pump being in operation. In particular, when the power-mode of the steam power plant is shut off, the (main) first cooling circuit for cooling the condenser with a high cooling power is not needed any longer to be in operation. The circulation of the first cooling fluid driven by the first pump can be stopped by shutting off the first pump and consequently the relatively high consumption of electrical power of the first pump does not occur any longer.

Although the main pump is shut off, the components will still be cooled by the aid of the second cooling circuit. This is of particular advantage for solar power plants, which do not deliver power during the standby-mode but still require some components to be cooled during the standby-mode. The maintained cooling of components provided by the relatively low power consuming second pump has two advantages. Firstly it increases the overall efficiency of the solar power plant. Secondly, even under shut off condition of the main pump, the solar power plant can be re-started relatively fast during the morning hours because the components can be kept in operation under chilled condition during standby-mode.

The control unit controls the state of the pumps, which is switched on or switched off. In particular the control unit distinguishes between the standby-mode and the power-mode in order to set the operation of the first pump and the second pump appropriately. It may also control the pumping power. The control unit may also be connected with all valves in the cooling circuits and adjust the state of the valves (open/closed/semi-open) by control signals which control state-setting-motors of the valves. The control unit may also receive a number of sensor signals from temperature or pressure sensors in order to appropriately adjust, synchronize or de-synchronize the operation of the pumps and to individually switch a pump on while the other pump is switched off and/or to open/close individual valves.

Particularly advantageous embodiments and features of the invention are given by the dependent claims and the following description. In particular the method according to the invention may be further developed according to the dependent claims of the steam power plant and advantages elaborated in the context of the device claims do apply as well for the method claims.

In the following the term "PAB hot part" shall mean a hot part of the first cooling circuit. It describes that part of the first cooling circuit that is located downstream to the condenser with regard to the flow direction of the first cooling fluid under operation of the first pump and connects the condenser and the cooling tower. "PAB cold part" shall mean a cold part of the first cooling circuit. It describes the other part of the first cooling circuit located upstream to the condenser.

Further, the term "PCB hot part" shall mean a hot part of the second cooling circuit. It describes that part of the second and/or the first cooling circuit that is used to guide the first fluid heated up in the heat exchanger from the heat exchanger back into the cooling tower. "PCB cold part" shall mean a cold part of the second cooling circuit. It describes the other part of the second and/or first cooling circuit used to feed the heat exchanger with the first cooling fluid from the cooling tower.

According to one aspect of the invention the steam power plant comprises a cooling tower, which is comprised in the first cooling circuit and the second cooling circuit and the second cooling circuit is independently from the first cooling circuit connected at its cold part to the cooling tower. Advantageously this allows to bypass the first cooling circuit at its cold part and to directly feed the second cooling circuit with the first cooling fluid in its cool state. Hence, a decoupling of the cold parts of the second cooling circuit from the first cooling circuit is achieved.

According to a first embodiment of invention the second pump is installed inside a water containing part of the cooling tower, e.g. in a so termed pump pit, in which the cold cooling fluid is collected after it was cooled down in the cooling tower. If the second pump is located inside of the cooling tower it can be supported in such a way that it can be located at different levels, or in other words it is submersible. However, once installed at a certain position the second pump remains in the selected position.

According to a second embodiment of invention the second pump is installed outside of the cooling tower. If the second pump is located outside of the cooling tower it can serve two purposes. During standby-mode it is used to pump the first fluid in the second cooling circuit independently from the first pump. During power-mode it may be used as a booster pump in the second cooling circuit, which increases the pressure of the first cooling fluid in the second cooling circuit, which in particular is reasonable if a plate-type heat exchanger is used in the second cooling circuit and the pressure drop in the second cooling circuit is higher than in the first cooling circuit. In this embodiment, the control unit according to the invention or an additional booster pump controller may control the second pump during a booster pump operation mode. During power-mode the booster pump would perform normal boosting operation in synchronisation with the operation of the first pump. But during standby-mode the booster pump will perforin independent auxiliary cooling operation completely independent from the main pump that is switched off during standby-mode. The use of the second pump for two different operations is highly efficient and cost saving.

Advantageously, in a preferred embodiment the second pump is installed in the cold part of the second cooling circuit, which would be either in the cooling tower or preferably close to it outside of the cooling tower.

In a preferred embodiment of the invention the first cooling circuit comprises a valve to bypass the first pump. This is of particular advantage if the first cooling circuit and the second cooling circuit have a common pipe section for returning the heated first cooling fluid into the cooling tower. In the following, this valve is termed "bypass valve". The state (open/closed) of the valve may be controlled by the control unit.

A further valve may be located in this common pipe section and inhibits the flow of the first cooling fluid back into the cooling tower. The state (open/closed) of the further valve may be controlled by the control unit. In this case—at the junction where the second cooling circuit and the first cooling circuit are connected behind the heat exchanger (in flow direction of the first cooling fluid)—the first fluid can take its way back into the cooling tower in opposite direction as it would be the case if the main pump would be in operation. The first cooling fluid will flow from the heat exchanger back in direction of the first pump where it bypasses the first pump via said bypass valve directly into the cooling tower. Starting from the condenser on its way back to the cooling tower the first cooling fluid flows through parts of the cold part of the first cooling circuit.

As a particular advantage, on its way back to the cooling tower the first cooling fluid passes through the condenser in opposite direction as it would pass if the first pump would be in operation. In this configuration not only the components but also the condenser can be cooled without the necessity of a switched on first pump. The backward flow of the first cooling fluid through the condenser advantageously provides for a longer lifetime of a turbine of the power plant because even during temporary power-mode interruption the turbine can still be kept under sealing steam, which after departing from the turbine may be partly fed into the condenser, while another part may be fed into a so-termed gland steam condenser where it is cooled. The use of the sealing steam is necessary to keep the seals of the turbine tight. This prevents air to enter into the turbine and the condenser.

However, also the sealing steam must be cooled in the condenser, because otherwise the condenser could be damaged due to overheating. The cooling of the condenser and in turn also the cooling of the sealing steam is provided by the first cooling fluid pumped though the condenser before entering into the cooling tower through the bypass valve. The cooling of the sealing steam does not require the high cooling power provided by the main pump that generates a high throughput of the first cooling fluid. The cooling power provided by the second pump, which serves for lower throughput of the first cooling fluid, is sufficient to appropriately cool the condenser and the components. But also the power-mode of the power plant can be ramped up much faster after an interruption because also the condenser is still in (reduced) operation and kept evacuated.

It would also be possible to realize the invention without said bypass valve, if the first pump allows the first cooling fluid to flow in direction reverse to the pumping direction. If the first pump does not provide this feature the first cooling fluid may not circulate through the condenser. After cooling the heat exchanger the third fluid would immediately find its way back into the cooling tower because it could only flow in the direction as it would flow during normal power generating operation, so to say when the first pump is in operation.

According to a further aspect of the invention and in order to better control the direction of the flow of the first fluid a further valve is located in a first common pipe section of the first cooling circuit and the second cooling circuit. The first common pipe section is realized between the cooling tower and a point of the cooling system where a hot part of the second cooling circuit joins a hot part of the first cooling circuit and the cooling tower. As a result the further valve can be used to block or to enable any fluid flow through the common pipe section, preferably in dependency of the actual operation. As an operation condition the control unit that controls the valve may decide between power-mode (valve open) or standby-mode (auxiliary cooling/valve closed).

In a further embodiment a bypass pipe section with a further valve is located in parallel to a PAB hot part of the first cooling circuit and connects the heat exchanger with the cooling tower. The state (open/closed) of the further valve may be controlled by the control unit. This configuration provides a higher degree of flexibility of the cooling system. In particular it allows the hot part of the second cooling circuit to be operated completely independently from the hot part of the first circuit or in combination with the first circuit, as the case may be.

A further aspect of the invention relates to the control of the flow of the first cooling fluid in the second cooling circuit. In this context it is of advantage if the second cooling circuit comprises in its cold part a first pipe branch directly connected with the cooling tower and a second pipe branch connected with the a cold part of the first cooling circuit and a number of further valves for selectively controlling the flow of the first fluid in the cold part of the second cooling circuit. The states (open/closed) of the individual valves may be controlled by the control unit.

The configuration of branches and valves allows activating an inflow of the first cooling fluid from the cold part of the first cooling circuit into the cold part of the second cooling circuit, which is of interest under main pump operation during power-mode.

This configuration of branches and valves also allows selectively switching on a direct inflow of the first cooling fluid from the cooling tower into the second cooling circuit, which is of interest if the main pump is switched off during standby-mode. During standby-mode it further allows to select the direction the flow of the first cooling fluid through the heat exchanger.

For example, during standby-mode, if, behind the heat exchanger, the backflow directly into the cooling tower is blocked, the first fluid can flow through the condenser in backward direction and e.g. bypass the first pump via a bypass valve.

In a further example, in which the bypass valve does not exist and the first branch comprises the second pump, the flow of the first cooling fluid may also be directed to branch off via the second pipe branch from the cold part of the second cooling circuit into the cold part of the first cooling circuit. Following the first cooling circuit, the first cooling fluid flows through the condenser in a forward direction as it would flow under main pump operation during power-mode.

Hence, in both examples described above, the condenser is cooled by the first cooling fluid under operation of the second pump only. The flow of the first cooling fluid through the condenser may be in a forward direction as would be the case under main pump operation, or in a backward direction.

In a preferred embodiment the steam power plant is a solar thermal power plant that comprises an energy conversion circuit that comprises the condenser, a steam turbine and a solar energy converter system that is designed to use solar energy to produce steam for driving the steam turbine that is located between the solar energy converter system and the condenser. The application of the invention in the context of a solar power plant is of particular advantage because such a solar power plant must be driven down daily or even multiple times a day. The event that triggers the need to drive down the plant may be e.g. night hours, a sand storm or cloudy or foggy weather condition or in other words a general lack of sufficient sunlight to be in power-mode. For the duration of the event the plant must be kept in standby-mode under sealing steam. Thereafter it must be ramped up back to power-mode. Now, advantageously, during the standby-operation the first pump is not any longer required to be operated for cooling the components. This cooling function is now achieved by the independent operation of the second cooling circuit. In comparison to the known configuration the invention provides for significantly increased energy efficiency because the energy saving effect achieved is an accumulation of a daily contribution accumulated over the entire lifetime of the solar thermal power plant.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numbers refer to like objects throughout. Objects in the diagrams are not necessarily drawn to scale.

DETAILED DESCRIPTION OF INVENTION

Figure 1:
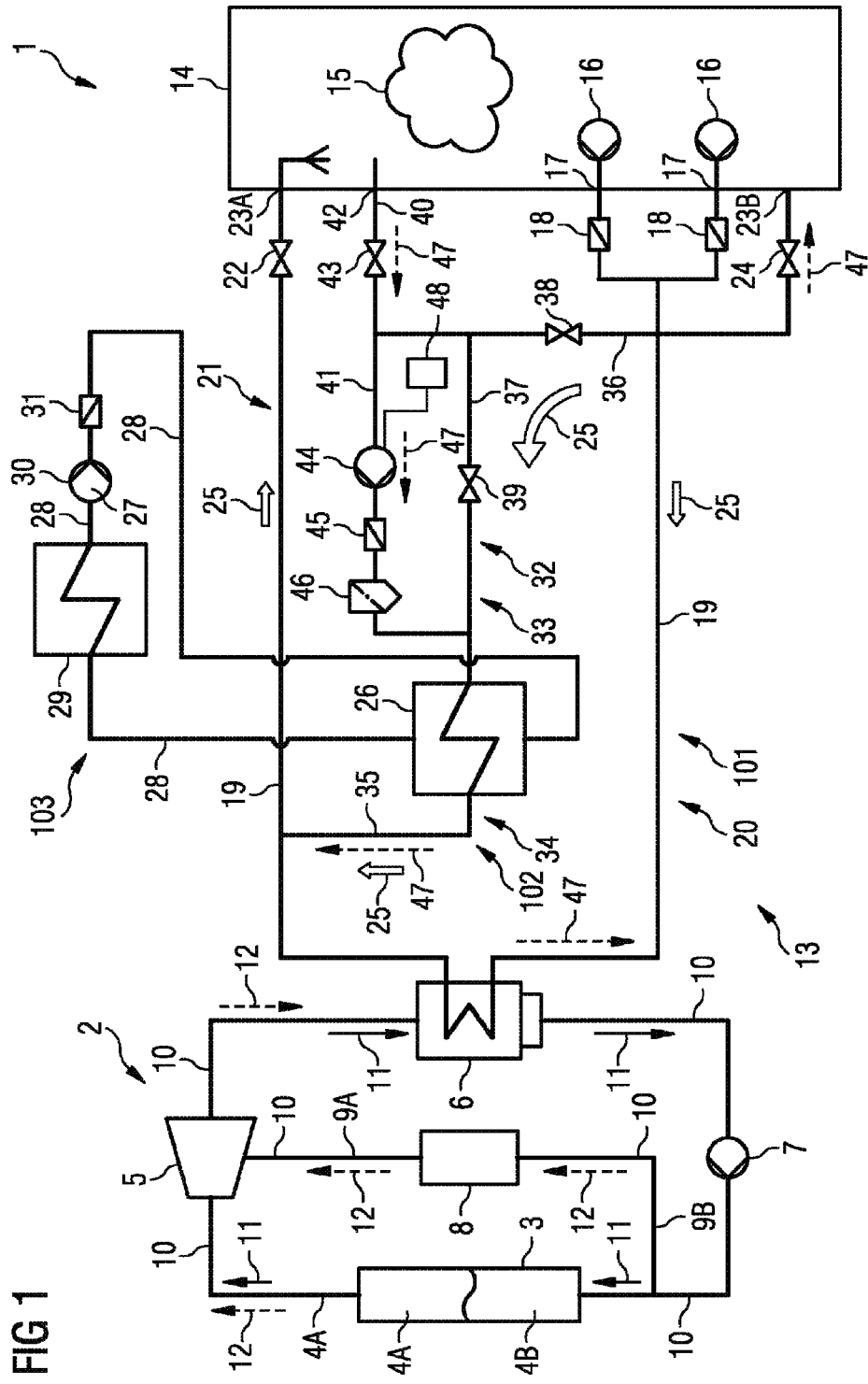
FIG. 1 shows a first embodiment of a steam power plant in a first operation mode.

In FIG. 1 a solar steam power plant 1 is schematically depicted. In this solar steam power plant 1, during power-mode, solar energy is converted into electrical power.

The power plant 1 comprises an energy conversion circuit 2 that comprises a solar energy converter system 3 that is designed to use solar energy to produce steam 4A during power-mode. Therefore, in the solar converter system 3 a medium, normally water, is heated up (not shown in detail). The heating up of the medium may be achieved directly by utilizing the radiation of the sun to heat the medium. The heating of the medium may also be achieved indirectly by utilizing the radiation of the sun to heat up a heat transfer fluid, e.g. oil or any other substance. Thereafter the heat energy stored in the hot heat transfer fluid is transferred into the medium.

The energy conversion circuit 2 further comprises a steam turbine 5 connected to the converter system 3. The turbine 5 is driven by the steam 4A in order to generate electrical power for a grid (not depicted). The conversion circuit 2 also comprises a condenser 6 connected to the turbine 5, which is used for cooling down the steam 4A and to produce a condensate 4B of the steam 4A. Also a conversion circuit pump 7 is installed in the conversion circuit 2 to pump the condensate 4B back into the conversion system 3.

Also depicted is a sealing steam generator 8, which is used to generate a sealing steam 9A during standby-mode of the power plant 1 when the steam 4A cannot be generated. The sealing steam 9A is fed into the turbine 5 at a separate inlet of the turbine 5. Departing from the turbine 5 the sealing steam 9A is also fed into the condenser 6, where it is cooled down and departs as a condensate 9B of the sealing steam 9A. The use of the sealing steam 9A allows the rapid ramp up of the plant 1 back to power-mode during the morning hours and increases the lifetime of the turbine. The conversion circuit pump 7 also pumps the condensate 9B of the sealing steam 9A. For the sake of clarity is to note that—although two different reference numbers are used for the steam 4A and the sealing steam 9A—in both cases the evaporated medium forms the steam 4A or 9A. During the power-mode the sun causes the medium to evaporate and to form the steam 4A. During the standby-mode the sealing steam generator 8 acts as an auxiliary heating device that substitutes the sun to cause the medium to evaporate and to form the sealing steam 9A. Only the steam 4A, when compared with the sealing steam 9A, typically provides the steam mass that can be used to generate electricity via the turbine 5.

The individual components 3, 5, 6, 7 and 8 of the conversion circuit 2 are connected by conversion circuit pipes 10. These and other components used for the power-mode of the power plant 1 are not depicted in details because they are common to steam power plants. The design of the conversion circuit 2 or its individual components 3, 5, 6, 7 and 8 can be more complex. For example, the converter circuit 2 typically comprises more than one turbine 5.

The flow direction of the steam 4A and its condensate 4B are indicated by first (solid) arrows 11. The flow direction of the sealing steam 9A and its condensate 9B are indicated by second (dashed) arrows 12.

In the following a cooling system 13 of the power plant 1 is discussed, which is in the focus of the present invention. The cooling system 13 comprises a first cooling circuit, abbreviated "PAB" 101 (a circulating water piping and culvert system or main cooling circuit), a second cooling circuit, abbreviated "PCB", 102 (service water piping and culvert system) and a third cooling circuit, abbreviated "PGB", 102 (closed cooling water system or component cooling system). Also depicted is a cooling tower 14, which is a part of the PAB 101 and the PCB 102. The cooling tower 14 cools down a first cooling fluid 15, which is water. The first cooling fluid 15 is used to perform cooling operations in the PAB 101 and the PCB 102.

During the power-mode the first cooling fluid 15 circulates from the cooling tower 14 through the PAB 101 and the PCB 102 and back to the cooling tower 14. This circulation is achieved by the aid of two main pumps 16 of the PAB 101, which are often termed circulating water pumps and located inside the pump pit of the cooling tower 14 close to cold-water outlets 17 of the cooling tower 14. Outside of the cooling tower 14 the PAB 101 comprises two first non-reversal valves 18 to prevent the first cooling fluid 15 to flow in reverse direction into the first pumps 16.

Also the condenser 6 belongs to the PAB 101. In the condenser 6 the first cooling fluid 15 and the steam 4A are thermally coupled during the power-mode. During the standby-mode only sealing steam 9A is thermally coupled with the first cooling fluid 15. In both cases the first cooling fluid 15 cools down the steam 4A, 9A.

The PAB 101 also comprises a PAB pipe system 19, which is thematically split or named according to the thermal condition of the first cooling fluid 15 during power-mode into a PAB cold part 20 and a PAB hot part 21. The PAB cold part 20 connects the condenser 6 with the cold-water outlets 17 of the cooling tower 14 while the PAB hot part 21 connects the condenser 6 with a first hot-water inlet 23A of the cooling tower 14. At the end of the PAB hot part 21 a first flow control valve 22 is installed. It is open during the power-mode. At the cold-water outlet 17 a bypass valve 24 is installed in parallel to the first pumps 16. It is closed during power-mode. Third (bold) arrows 25 indicate the circulation of the water 15 through the PAB 101 during the power-mode.

The PCB 102 comprises a heat exchanger 26, which thermally couples the first cooling fluid 15 with a second cooling fluid 27 that circulates in the PGB 103.

The PGB 103 cools down components (not depicted) of the power plant 1, which are different from the condenser 6. Therefore it comprises a PGB pipe system 28, which connects heat exchangers, located on or in the components to be cooled, and a closed cooling water pump 30 with the heat exchanger 26. For the sake of simplicity, only one component heat exchanger 29 is shown in the figures. The closed cooling water pump 30 drives the flow of the second cooling fluid 27, which may also be water. A second non-reversal valve 31 is located downstream to the closed cooling water pump 27. Most of the components connect to the PGB 103 have to be cooled not only during power-mode but also during the standby-mode. This is achieved by a particular design of the PCB 102 and a control unit 48, which will be explained in details below.

The PCB 102 comprises a PCB pipe system 32, which is named according to the temperature of the first cooling fluid 15 into a PCB cold part 33 and a PCB hot part 34. During the power-mode the PCB hot part 34 is realized by the aid of a first pipe section 35 that connects the heat exchanger 26 with the PAB hot part 21. Also that part of PAB hot part 21 that is used to lead the first cooling fluid 15 back to the first hot-water inlet 23A is part of the PCB hot part 34. During the power-mode the PCB cold part 33 is realized by the aid of a second pipe section 36 and a third pipe section 37. The second pipe section 36 comprises a second flow control valve 38 and the third pipe section 37 comprises a third flow control valve 39, which acts as a shut-off valve, wherein both valves 38 and 39 are open during the power-mode.

The PCB 102 also comprises a fourth pipe section 40 and a fifth pipe section 41.

At one end the forth pipe section 40 is directly connected with a second cold water outlet 42 of the cooling tower 4. At the other end the forth pipe section 40 joins the second pipe section 36. The forth pipe section 40 comprises a forth flow control valve 43, which acts as a further shut-off valve and which is closed during the power-mode.

The fourth pipe section 40 realizes a first pipe branch that directly connects the cooling tower 14 with the PCB 102. The second pipe section 36 realizes a second pipe branch that connects the PAB cold part 20 with the second cooling circuit PCB 102.

At one end the fifth pipe section 41 is connected with the fourth pipe section 40. At its other end the fifth pipe section 41 is connected with the heat exchanger 26. The fifth pipe section 41 comprises a second pump 44. A third non-reverse valve 45 is located downstream to the second pump 44. Downstream to the second non-reversal valve 45 the fifth pipe section 41 comprises a service cooling water debris filter 46. During the power-mode the second pump 44 can be used to boost the flow of the first cooling fluid 15 through the heat exchanger 26. If the second pump 44 is switched on, the fourth pipe section 40 becomes a part of the PCB cold part because cold first fluid flows through it into the PCB 102.

For the purpose of performing the standby-mode, when the first pumps 16 are switched off, the first flow control valve 22, the second flow control valve 38 and the third flow control valve 39 are closed. The bypass valve 24 and the fourth flow control valve 43 are opened. The second pump 44 is switched on and pumps the first cooling fluid 15 through the PCB 102 independently from the operation of the first pumps 16. The PCB cold part 33 is now realized by the aid of the fourth pipes section 40 and fifth pipe section 41. Now, the PCB hot part 34 changes its configuration and is realized by a part of the PAB hot part 21, which connects the first pipe section 35 with the condenser 6, and the PAB cold part 20, except for the first pumps 16, which are bypassed by the bypass valve 24. In FIG. 1 forth (dashed) arrows 47 indicate the flow of the first fluid 15 driven by the second pump 44 through the cooling system 13. It is highlighted that the first cooling fluid 15 flows through the condenser 6 in opposite direction when compared with the direction in the power-mode (herein termed "reverse direction"=in opposite direction with regard to the third arrows 25). During the standby-mode a control unit 48 controls the operation of the second pump 44. The control unit 48 is also used to control the valve states of valve 22, 24, 38, 39 and 43. Valve 38 and/or 39 and/or 43 realize a number of valves for selectively controlling the flow of the first cooling fluid 15 in the PCB cold part 33.

Figure 2:
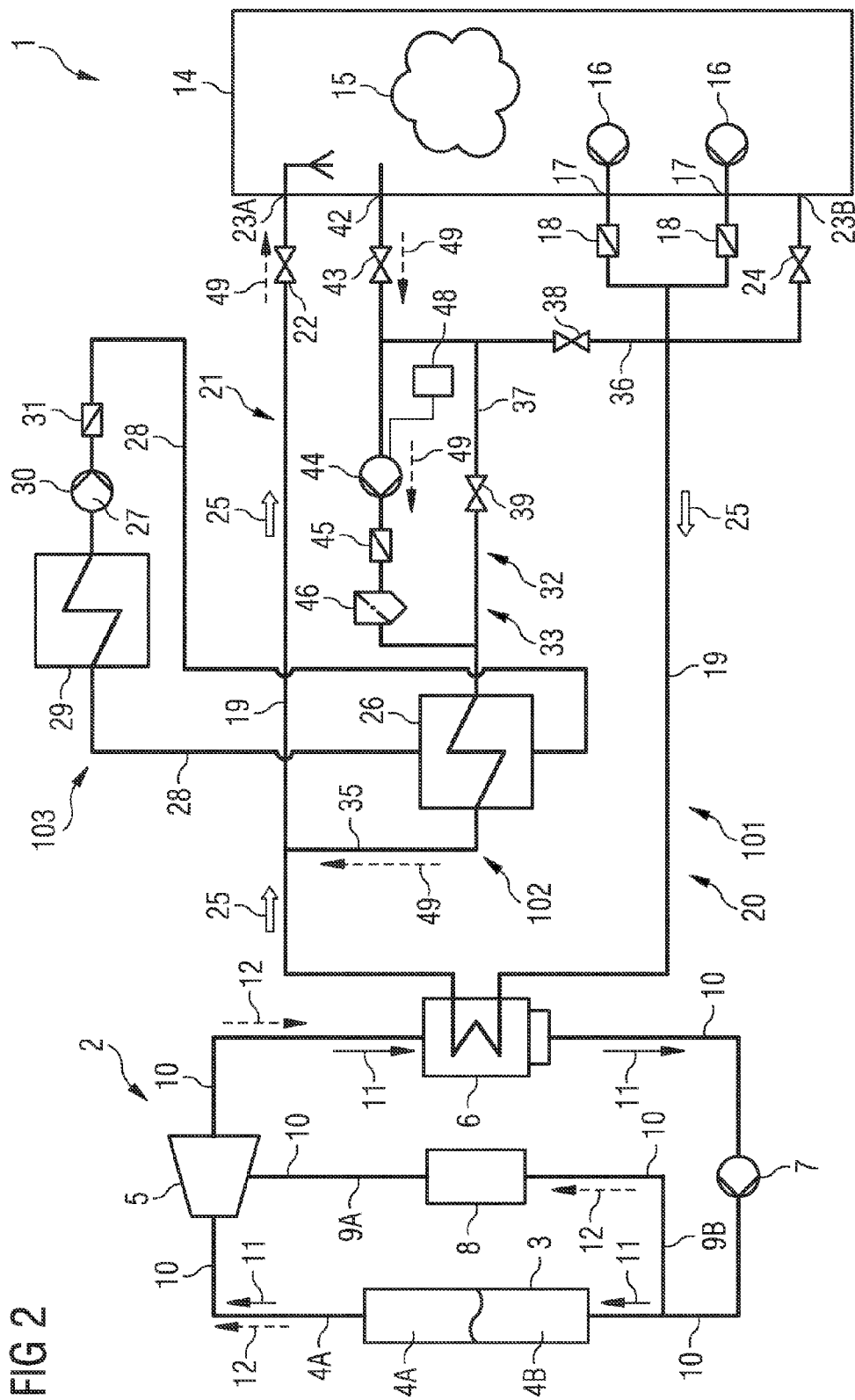
FIG. 2 shows the first embodiment in a second operation mode.

As depicted in FIG. 2, if the bypass valve 24 is in its closed state and the first flow control valve 22 is open, the flow of the first cooling fluid 15 will take place according to fifth (dashed) arrows 49. Now the PCB hot part 21 is the same as it is during the power-mode. The first cooling fluid 15 does not flow through the condenser 6, but component cooling is achieved.

Figure 3:
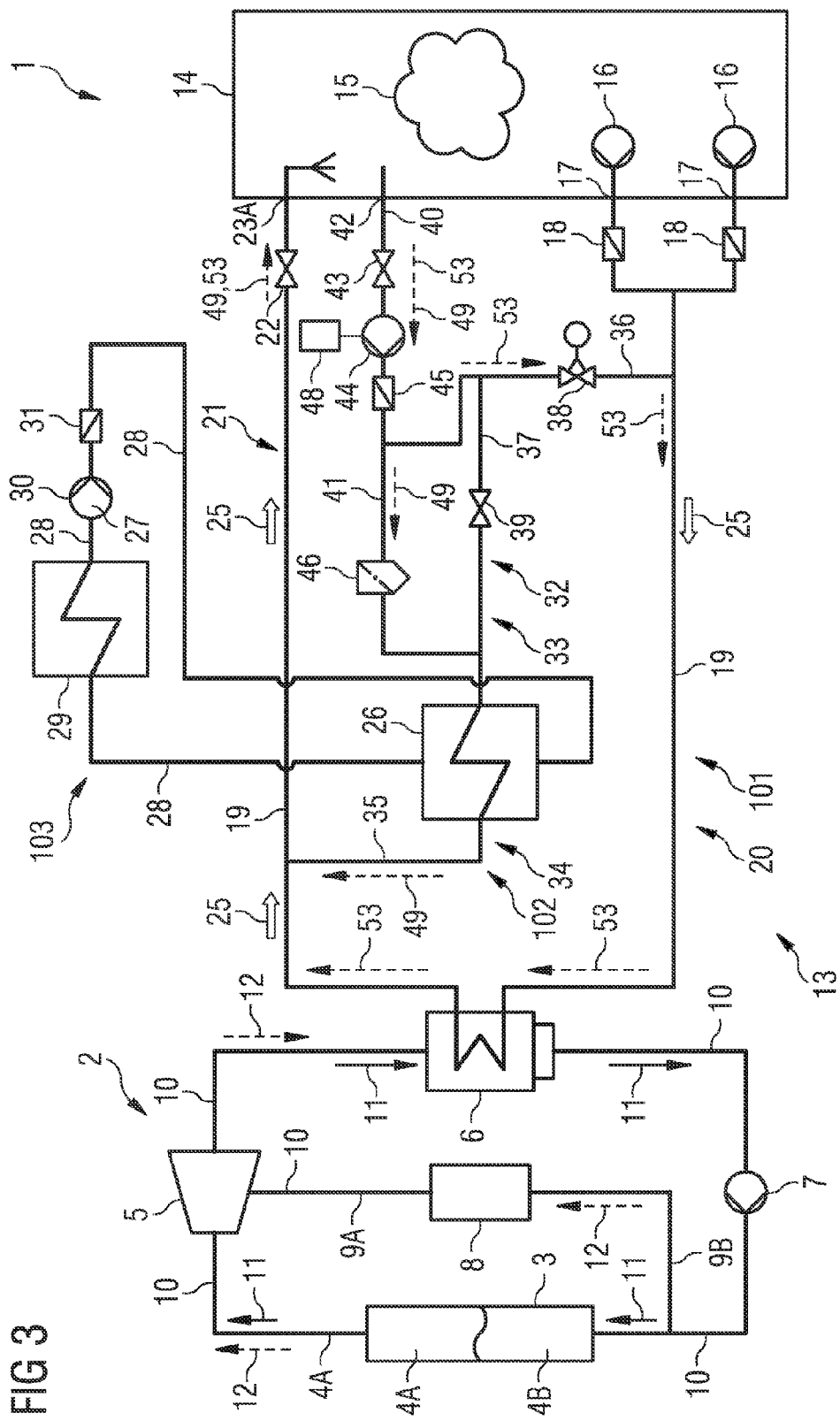
FIG. 3 shows a second embodiment of the steam power plant.

FIG. 3 shows a second embodiment of the power plant 1. In this embodiment the second pump 44 together with the third non-reversal valve 45 is shifted from the fifth pipe section 41 into the fourth pipe section 40. The bypass valve 24 is omitted. Without the first pumps 16 being in operation this configuration allows two different operation scenarios.

In a first scenario the first flow control valve 22 is open, the second flow control valve 38 is closed, the third flow control valve 39 is closed and the fourth flow control valve 43 is open. Now, the second pump 44 pumps the first cooling fluid in a direction indicated by the fifth arrows 49. This operation is identical to that one depicted in FIG. 2. The first cooling fluid 15 does not flow through the condenser 6. But component cooling is achieved.

In the second scenario the second flow control valve 38 is opened and the condenser 6 is cooled because the second pump 44 pumps the first cooling fluid 15 not only through the heat exchanger 26 but also through the condenser 6. In this configuration the flow direction of the first cooling fluid 15 in the condenser 6 is the same as it is during the power-mode, so to say in forward direction. This is indicated by seventh (dashed) arrows 53.

Figure 4:
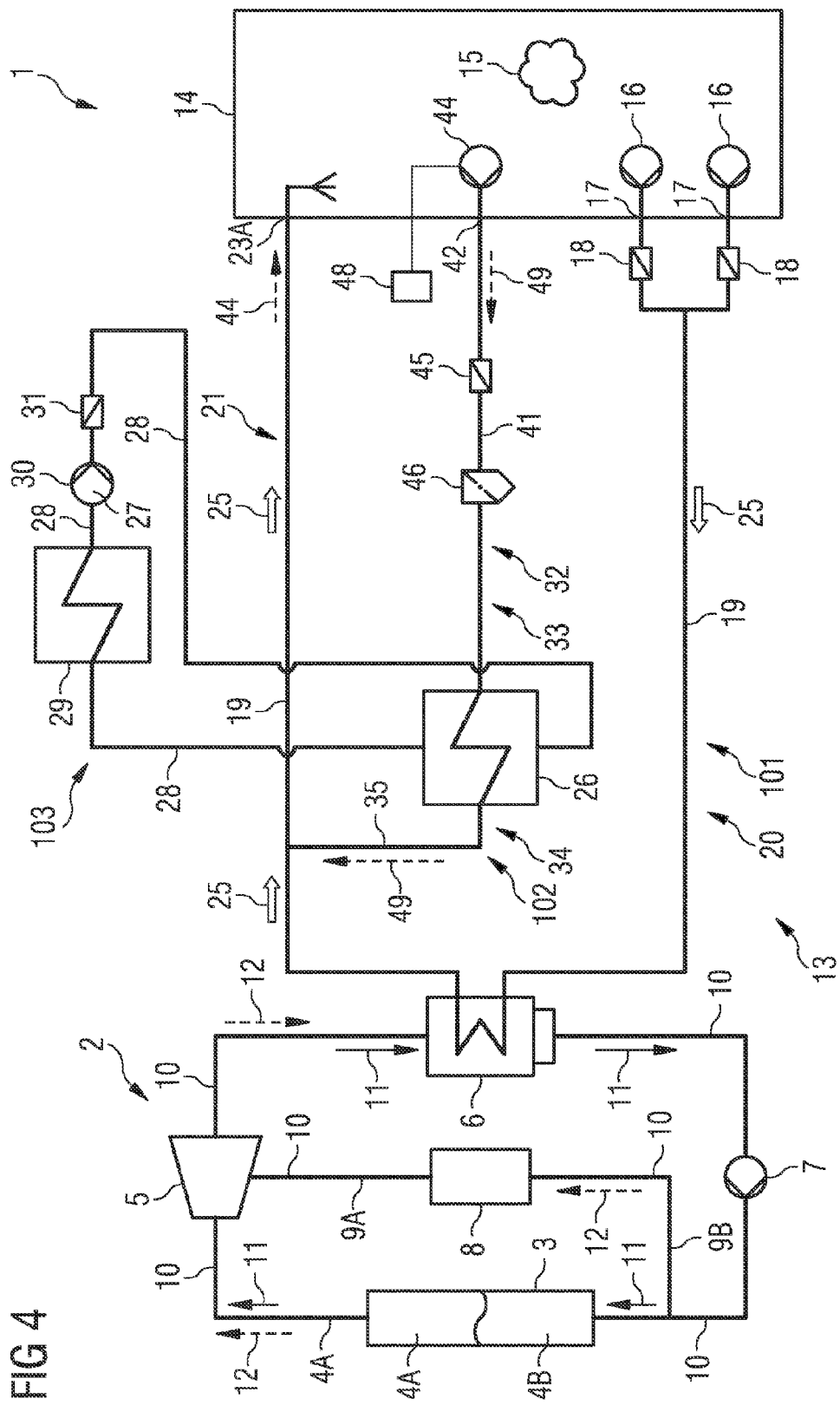
FIG. 4 shows a third embodiment of the steam power plant.

FIG. 4 depicts a third embodiment, in which the first flow control valve 22, the bypass valve 24, the second pipe section 36 and the second flow control valve 38, the third pipe section 37 and the third flow control valve 39 and the fourth pipe section 40 and the fourth flow control valve 43 are omitted. What remains in the PCB 102 is the fifth pipe section 41, which is directly connected with the second cold-water outlet 42. In contrast to the earlier discussed embodiments the second pump 44 is now located within a pump pit of the cooling tower 14 and forms an entry point of the fifth pipe section 41. In this configuration only component cooling can be achieved. The second pump 44 pumps the first cooling fluid 15 as indicated by the fifth arrows 49 through the PCB 102.

Figure 5:
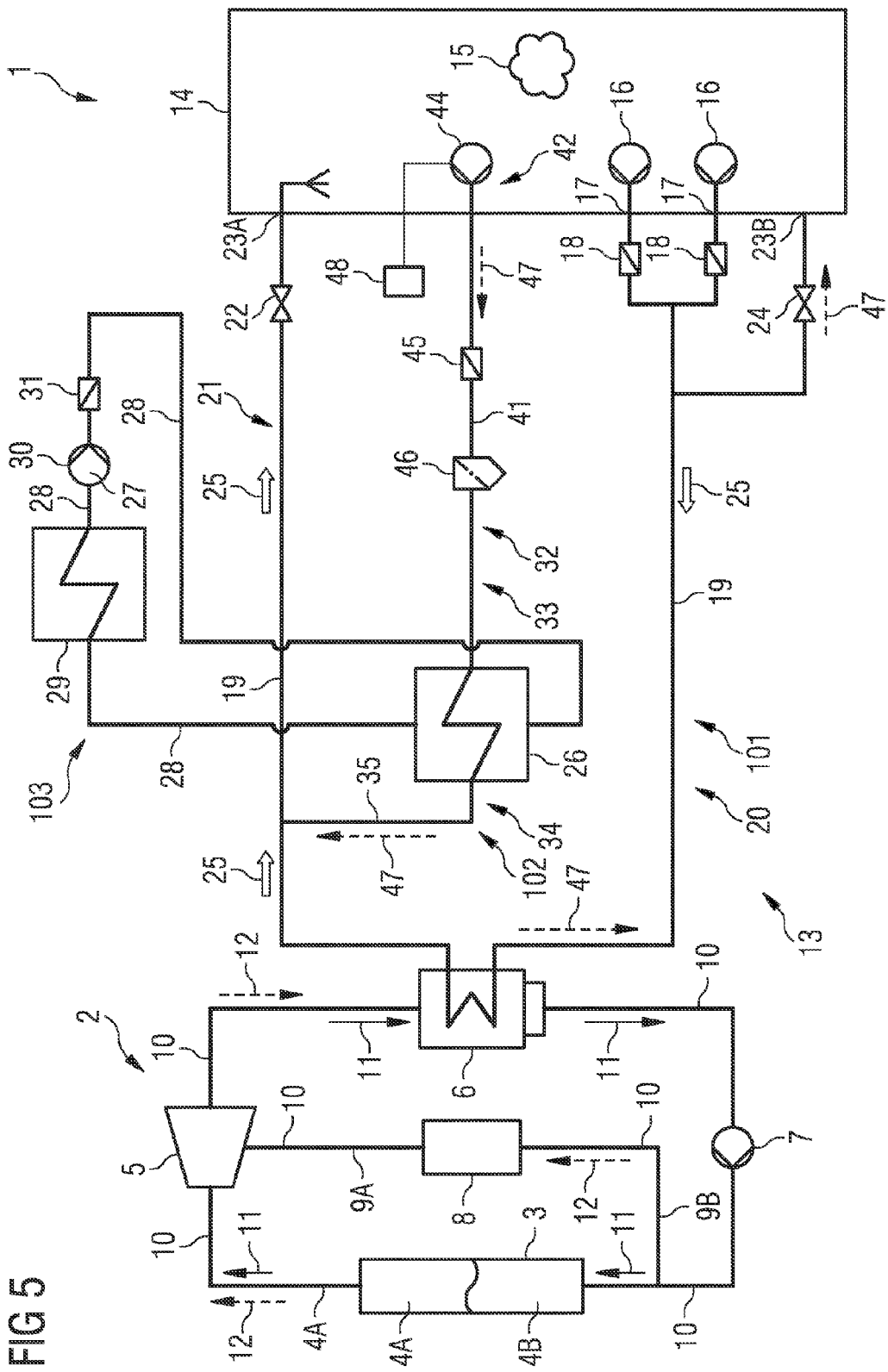
FIG. 5 shows a fourth embodiment of the steam power plant.

In FIG. 5 a fourth embodiment is shown. In contrast to the third embodiment, now the bypass valve 24 and the first flow control valve 22 are installed as it was depicted in the embodiments displayed in FIG. 1 and FIG. 2. During standby-mode the second flow control valve 22 is closed and the bypass valve 24 is open. The second pump 44 pumps the first cooling fluid 15 from the cooling tower 14 through the heat exchanger 26 and in reverse direction through the condenser 6 back into the cooling tower 14. The direction of flow is indicated by the forth arrows 47. Cooling of the components as well as cooling of the condenser 6 is achieved.

Figure 6:
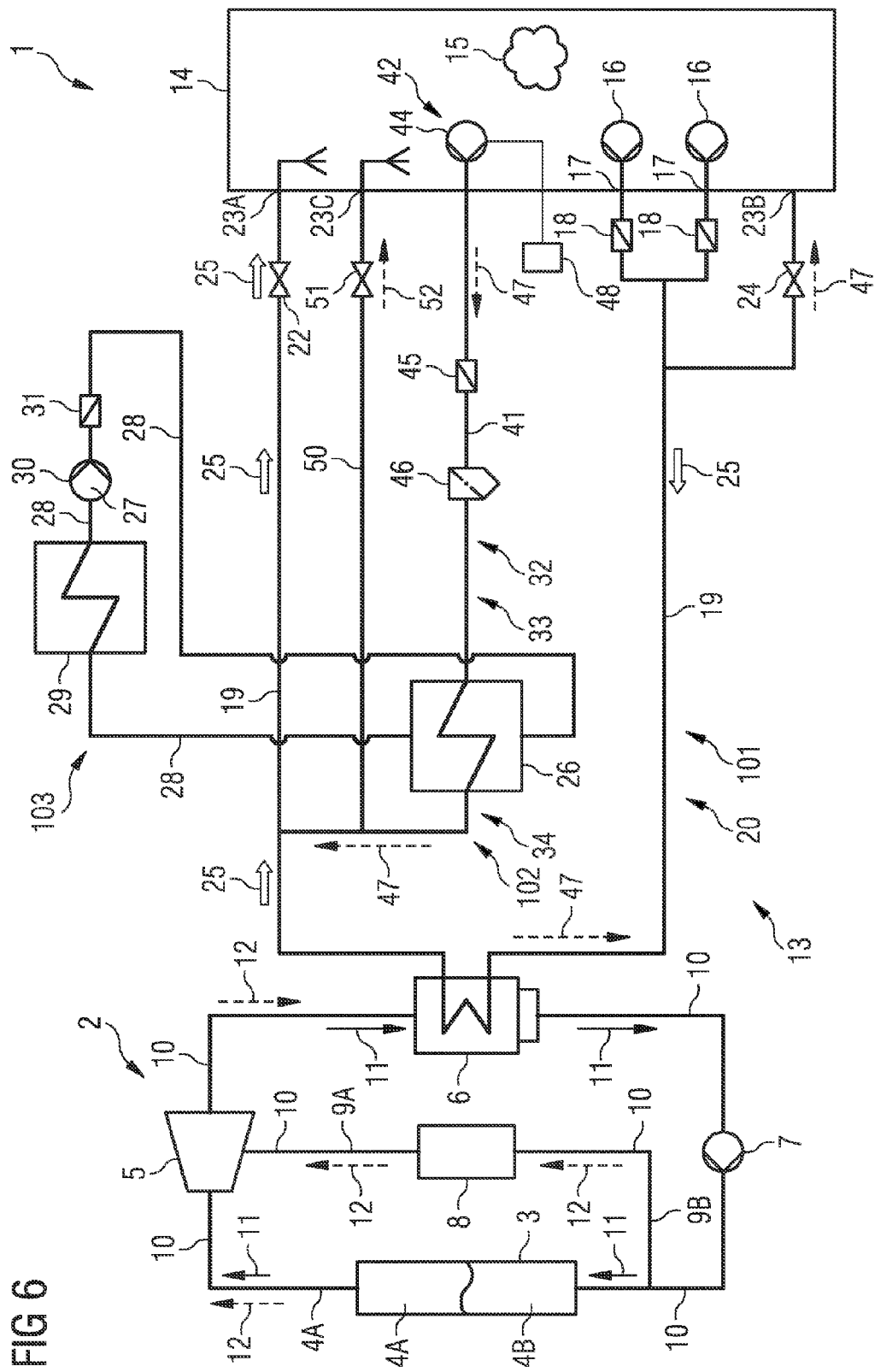
FIG. 6 shows a fifth embodiment of the steam power plant.

In FIG. 6 a fifth embodiment is visualized. In contrast to the fourth embodiment a sixth pipe section 50 with a fifth flow control valve 51 connects the first pipe section 35 with a third hot-water inlet 23C of the cooling tower 14. During standby-mode the first flow control valve 22 is closed, the fifth flow control valve 51 is open and the bypass valve 24 is also open. The second pump 44 pumps the first cooling fluid 15 from the cooling tower 14 through the heat exchanger 26 and in reverse direction through the condenser 6 and back into the cooling tower 14, which is indicated by the fourth arrows 47. A part of the first cooling fluid 15 passes along the sixth pipe section 50 back into the cooling tower 14, which is indicated by a sixth (dashed) arrow 52. If also the bypass valve 24 is closed, all of the first cooling fluid 15 will depart from the heat exchanger 26 and flow back into the cooling tower 14, as indicated by the sixth arrow 52. Hence, the cooling of the condenser 6 may be selectively switched on or off.

Although the present invention has been disclosed in the form of preferred embodiments and variations thereon, it will be understood that numerous additional modifications and variations could be made thereto without departing from the scope of the invention. In general, although only two first pumps 16 and one second pump 44 are used to explain the various embodiments, it is evident that the number of pumps shall not be limited. Dependent on the actual technical requirements the number may be selected appropriately. In the figures the control unit 48 is shown with connection only to the second pump 44 for the sake of simplicity. Although this is not visualized, it is clarified at this point that the control unit 48 is also connected with the first pumps 16 and the valves 22, 24, 38, 39 and 43 and with the closed cooling water pump 30. The invention my also be realized if instead of a cooling tower a fresh water cooling is used in a flow-though cooler.

The term "flow control valve" shall be understood either as a valve that defines the flow rate of the respective cooling fluid and/or as a valve that enables or inhibits any flow of the respective cooling fluid, as the case may be.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:
1. A steam power plant, comprising:
a cooling system which comprises a first cooling circuit, a second cooling circuit and a third cooling circuit, wherein
the first cooling circuit comprises
a condenser to condense steam, and
a first pump to pump a first cooling fluid through the condenser in order to cool the condenser,
the third cooling circuit is a closed cycle cooling circuit that utilizes
a second cooling fluid to cool down at least one component that is different from the condenser, and
the second cooling circuit comprises
a heat exchanger that thermally couples the first cooling fluid and the second cooling fluid and utilizes the first cooling fluid in the heat exchanger to cool down the second fluid, and
a second pump to pump the first cooling fluid through the second cooling circuit independently from an operation of the first pump,
wherein the first cooling fluid that flows through the second cooling circuit is directed into the first cooling circuit at a hot part of the second cooling circuit, and
directed to flow through the condenser in reverse direction when compared to the flow direction caused by the first pump or directed to flow through the condenser in forward direction when compared to the flow direction caused by the first pump.

2. The steam power plant according to claim 1, comprising: a cooling tower, which is part of the first cooling circuit and the second cooling circuits.

3. The steam power plant according to claim 1, wherein the second pump is installed inside a water containing part of a cooling tower.

4. The steam power plant according to claim 2, wherein the second pump is installed inside a water containing part of the cooling tower.

5. The steam power plant according to claim 1, wherein the second pump is installed outside of a cooling tower.

6. The steam power plant according to claim 2, wherein the second pump is installed outside of the cooling tower.

7. The steam power plant according to claim 1, wherein the first cooling fluid bypasses the first pump through a valve.

8. The steam power plant according to claim 7, wherein a further valve is located in a first common pipe section of the first cooling circuit and the second cooling circuit.

9. The steam power plant according to claim 1, wherein a bypass pipe section with a further valve is located in parallel to a hot part of the first cooling circuit and connects the heat exchanger with the cooling tower from a pipe section to a hot-water inlet.

10. The steam power plant according to claim 2, wherein the second cooling circuit comprises a cold part which includes
a first pipe branch directly connected to the cooling tower,
a second pipe branch connected to the cold part of the first cooling circuit, and
a plurality of further valves for selectively controlling a flow of the first cooling fluid in the cold part of the second cooling circuit.

11. The steam power plant according to claim 1, wherein the plant is a solar thermal power plant that comprises an energy conversion circuit which comprises
the condenser,
a steam turbine, and
a solar energy converter system that is designed to use solar energy to produce steam for driving the steam turbine which is located between the solar energy converter system and the condenser.

12. The steam power plant according to claim 1, wherein the plant further comprises
a control unit that is designed
to control an operation of the first pump during a power-mode of the plant, and
to switch off the first pump during a standby mode of the plant, and
to switch on the second pump during the standby-mode.

13. A method of operating a cooling system of a steam power plant, comprising:
providing a cooling system which comprises a first cooling circuit, a second cooling circuit and a third cooling circuit,
condensing steam by a condenser of the first cooling circuit,
pumping a first cooling fluid through the condenser by a first pump in a direction from the first pump towards the condenser in order to cool down the condenser,
cooling a component, which is different from the condenser, by a second cooling fluid of the third cooling circuit, wherein the third cooling circuit is a closed cycle cooling circuit,
thermally coupling the first cooling fluid and the second cooling fluid by a heat exchanger of the second cooling circuit,
cooling the second cooling fluid by the first cooling fluid in the heat exchanger of the second cooling circuit,
using the first pump during a power-mode, and
providing and using a second pump to pump the first cooling fluid through the second cooling circuit during a standby-mode, and
stopping the first pump during the standby-mode,
wherein the first cooling fluid that flows through the second cooling circuit is directed into the first cooling circuit at a hot part of the second cooling circuit, and
directed to flow through the condenser in reverse direction when compared to the flow direction caused by the first pump or
directed to flow through the condenser in forward direction when compared to the flow direction caused by the first pump.

14. The method according to claim 13, wherein a valve, which is included in a bypass pipe section that is located in parallel to a hot part of the first cooling circuit and connects the heat exchanger with the cooling tower, is opened to allow the first fluid in the second cooling circuit to bypass a cold part of the first cooling circuit.

15. The method according to claim 13, wherein a valve, which is included in a bypass pipe section that is located in parallel to a hot part of the first cooling circuit and connects the heat exchanger with the cooling tower, is closed to inhibit the flow of the first fluid in the bypass pipe section.

16. The method according to claim 13, wherein the second cooling circuit is fed at a cold part of the second cooling circuit with the first cooling fluid from a cooling tower independently from the first cooling circuit.

* * * * *